United States Patent
Griffin et al.

(10) Patent No.: US 7,200,756 B2
(45) Date of Patent: Apr. 3, 2007

(54) BASE CRYPTOGRAPHIC SERVICE PROVIDER (CSP) METHODS AND APPARATUSES

(75) Inventors: Daniel C. Griffin, Seattle, WA (US); Eric C. Perlin, Seattle, WA (US); Glenn D. Pittaway, Woodinville, WA (US); Klaus U. Schutz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 739 days.

(21) Appl. No.: 10/179,655

(22) Filed: Jun. 25, 2002

(65) Prior Publication Data

US 2003/0236987 A1    Dec. 25, 2003

(51) Int. Cl.
G06F 21/00    (2006.01)
G06K 19/07    (2006.01)

(52) U.S. Cl. ............................. 713/189; 726/9; 705/41

(58) Field of Classification Search ................ 713/189, 713/184; 726/20, 21; 705/55, 72
See application file for complete search history.

(56) References Cited

U.S. PATENT DOCUMENTS

| | | | |
|---|---|---|---|
| 5,689,565 A | | 11/1997 | Spies et al. |
| 5,933,503 A | | 8/1999 | Schell et al. |
| 6,038,551 A | | 3/2000 | Barlow et al. |
| 6,360,952 B1 * | 3/2002 | Kimlinger et al. | ........... 235/492 |
| 6,427,911 B1 * | 8/2002 | Barnes et al. | ................ 235/380 |
| 6,481,632 B2 * | 11/2002 | Wentker et al. | ............. 235/492 |
| 6,484,259 B1 * | 11/2002 | Barlow | ........................ 713/159 |
| 6,651,168 B1 * | 11/2003 | Kao et al. | .................... 713/185 |
| 6,792,536 B1 * | 9/2004 | Teppler | ...................... 713/178 |
| 6,834,799 B2 * | 12/2004 | Tanabiki et al. | ............ 235/382 |
| 2002/0120842 A1 * | 8/2002 | Bragstad et al. | ............ 713/156 |
| 2003/0154375 A1 * | 8/2003 | Yang | ......................... 713/172 |

FOREIGN PATENT DOCUMENTS

| | | |
|---|---|---|
| EP | 0982692 | 3/2000 |
| WO | WO0107990 | 2/2001 |
| WO | WO0118635 | 3/2001 |
| WO | WO0244874 | 6/2002 |

OTHER PUBLICATIONS

Wolfgang Rankl "Handbuch der Chipkarten" 1999, Hanser Verlag.
Tolga Kilicili "Smart Card HOWTO" Online Sep. 19, 2001 retrieved from url:http://www.faqs.org/docs/Linux-HOTWO/Smart-Card-HOWTO.html on Jun. 8, 2005.
D.P. Bovet and N. Cesati "Understanding the Linux Kernal", Jan. 1, O'Reilly.
"PKCS#11 v2.10 : Cryptographic Token Interface Standard", Cryptographic Token Interface Standard, Dec. 1999, pp. 12-31.

* cited by examiner

Primary Examiner—Gilberto Barrón, Jr.
Assistant Examiner—Thomas Szymanski
(74) Attorney, Agent, or Firm—Lee & Hayes, PLLC

(57) ABSTRACT

Apparatuses and methods are provided for interface logic that is configurable to operatively couple cryptography support logic and cryptography providing logic. The interface logic provides at least one management function to the cryptography providing logic. The management function includes at least one of the following four management functions: an identity management function, a file management function, a container management function, and a cryptography management function.

20 Claims, 3 Drawing Sheets

BASE CRYPTOGRAPHIC SERVICE PROVIDER (CSP) METHODS AND APPARATUSES

TECHNICAL FIELD

This invention relates generally to computing devices, and more particularly, to methods and apparatuses for use in operatively interfacing different types of portable token devices, such as, for example, different types of smart cards, with a computing device.

BACKGROUND

Cryptography is commonly employed to authenticate data, encode data, or encrypt/decrypt data in a manner that allows the data to be stored and/or transmitted securely. Cryptography is becoming more and more popular as computers and networks increase in number, size and complexity.

By way of example, public/private key pairs are commonly used in computing devices, such as, personal computers (PCs) and the like, to provide asymmetric encryption of data that is exchanged between communicating parties. Asymmetric encryption uses public-key encryption algorithms. Public-key algorithms use two different keys (known as a key pair), namely, a public key and a private key. These two keys are typically derived from extremely large prime numbers making them mathematically related. However, it is practically impossible to derive one key from the other. As suggested by their names, the public key is made public, while the private key is kept private. In a typical static machine concentric PC environment, the private key may never leave the PC on which it was generated.

Information (i.e., data) that is encrypted with either one of the keys can only be decrypted with the other one of the keys. Thus, for example, data encrypted with the private key can only be decrypted with the public key, and vice versa.

As an additional safety measure, a session key may also be used during a communication session. A session key is essentially a temporary private key or secret that is shared between the communicating parties. Upon decrypting the session key the receiving party can decrypt the encrypted data. The integrity of the decrypted message can be verified by hashing the message to produce a message digest, and comparing that digest value to the digest computed by the sender and included in the encrypted message.

One problem associated with such cryptography techniques is that a third party might attempt to masquerade as one of the communicating parties, for example, by fraudulently holding out a public key that is represented to be one of the communicating parties public keys. Any messages or hashes that are intended for the communicating party and encrypted with the fraudulent public key could conceivably be decrypted with the accompanying private key by the third party.

To address this problem and others, a digital certificate can be employed by the communicating parties. A digital certificate is a credential issued by a trusted organization or entity called a certification authority (CA), such as, for example, VeriSign, Inc. This credential typically contains a public key and data that identifies the certificate's subject (i.e., the applicable communicating party). A certificate is usually issued by a CA only after the CA has verified the certificate's subject's identity and has confirmed that the public key included with the certificate belongs to that subject. The certificate may also include a digest of the certificate's contents that is signed with the private key of the CA to ensure that the certificate has not been altered or forged.

A CA may also provide self-signed certificates, or root certificates, that are to be inherently trusted. A CA may itself be certified by a hierarchy of other CAs; such information is usually included within the certificate. When a digital certificate is used to sign documents and software, this information is stored with the signed item in a secure and verifiable form that can be displayed to a user to establish a trust relationship.

Over a period of time, digital certificates will tend to accumulate on a PC. These digital certificates are usually collected in a certificate store. Tools are provided, typically as application programming interface (API) functions that allow the user to store, retrieve, delete, enumerate, verify, or otherwise maintain the digital certificates within the certificate store.

With this in mind, Microsoft Corp. of Redmond, Wash., develops software, operating systems and other applications for use with a variety of "machines", including general and special purpose computers, PCs, portable devices, and the like. Microsoft Corp. has developed a Cryptographic API (hereinafter, generically referred to as "CryptoAPI") that provides a controlled/expandable interface between applications seeking cryptographic services and programs/devices that can provide such cryptographic services. Within CryptoAPI tools (e.g., functions) are provided that can be used to manage the digital certificates in the digital store and attach the digital certificates to data files. For example, CryptoAPI maintains a certificate revocation list (CRL) that is typically issued by the CA and lists digital certificates that are no longer valid. CryptoAPI also supports a certificate trust list (CTL) that identifies items that have been signed by a trusted entity. The various digital certificates, CRLs and CTLs within the certificate store are normally kept in non-volatile memory within the machine, such as, for example, a disk file or the system registry.

The cryptographic programs/devices that can provide the requested cryptographic services may include general purpose and/or special purpose hardware/software that is added to the machine and provides the necessary unique cryptographic token. Thus, for example, CryptoAPI allows new/additional cryptography devices/tokens to be added to the machine and acts as an interface between the requesting application(s) and the added cryptographic device/tokens. This type of API functionality/interface is well known and described in greater detail in U.S. Pat. No. 5,689,565, issued Nov. 18, 1997 to Spies et al.

The above-described API functionality/interface tends to work well with static machine concentric tokens, since it basically assumes that the cryptographic device(s) is fixed in place, always available, and used only by the local machine. However, if some of the tokens are portable, then the API functionality/interface will not always be able to locate the needed token(s).

Consequently, with the recent popularity of smart cards (SCs) and other types of portable token carrying and/or removable processing devices, designers have been required to provide some form of interfacing logic that allows a particular SC, etc., to operate with the CryptoAPI. This presented several problems. For example, if a PC or other like computing device needed to be able to support different types of SCs, then it would need to maintain the proper interfacing logic, e.g., software, for each of the of the different SCs. Moreover, as it turned out in many cases, the interfacing logic could be very complex to build and design.

For these and other reasons, there is a need for improved methods and apparatuses for operatively coupling portable token mechanisms and/or other like removable/non-removable processing devices to certain cryptography supporting logic within various forms of computing devices and/or appliances.

SUMMARY

The above stated needs and others are met, for example by an apparatus in accordance with certain implementations of the present invention. The apparatus includes interface logic that is configurable to operatively couple cryptography support logic and cryptography providing logic. The interface logic provides at least one management function to the cryptography providing logic. The management function includes at least one of the following four management functions: an identity management function, a file management function, a container management function, and a cryptography management function.

In accordance with other implementations, a method is provided. The method includes providing interface logic configurable to operatively couple cryptography support logic and cryptography providing logic, and configuring the interface logic to perform at least one activity selected from a group of activities including an identity verification activity, a file accessing activity, a container accessing activity, and a cryptographic algorithm activity, when operatively coupled to the cryptography providing logic.

In yet another implementation, a computer-readable medium is claimed. Computer-implementable instructions are provided by the computer-readable medium that can cause a computing or other like device to perform acts including establishing interface logic that is configurable to operatively couple cryptography support logic and cryptography providing logic, and causing the interface logic to establish at least one support function selected from a group of support functions comprising an identity support function, a file accessing support function, a container accessing support function, and a cryptographic support function.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Overview

The following sections describe exemplary improved coupling/interfacing schemes and techniques for use in various computing devices and the like. In accordance with certain aspects of the present invention, the exemplary coupling/interfacing schemes can be implemented as logic that includes hardware, firmware, software, or any combination thereof. The resulting logic can be configured, for example, to provide a "base" level of support for a plurality of different portable token devices and/or other like removable/non-removable processing devices, one example being smart cards.

While much of the following description considers existing features of Microsoft® Corporation's CryptoAPI based operating system sub-components and related modules, the scope of the invention is much greater and should not be so limited. For example, the coupling/interfacing schemes and techniques define useful demarcation lines for functions, responsibilities and/or associated abilities of the various developers/vendors and/or their products in an environment that supports both static and portable tokens. As such, the exemplary methods and apparatuses are portable or otherwise adaptable to other environments, machines, and/or operating systems.

Exemplary Computing Device Arrangement

Figure 1:
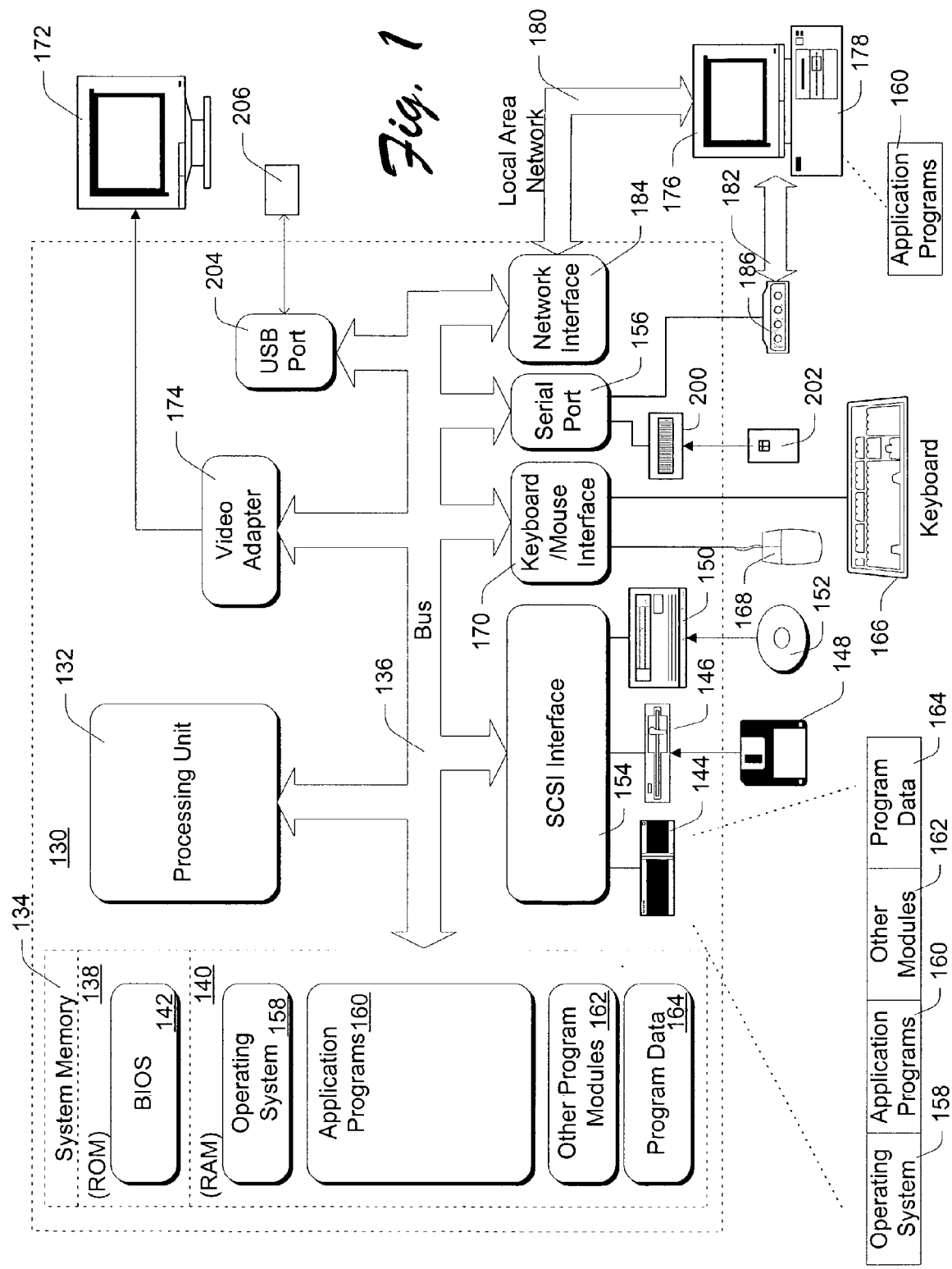
FIG. 1 is a block diagram depicting a computing device that is suitable for use with certain exemplary implementations of the present invention.

FIG. 1 is an illustrative block diagram depicting a general example of a computer 130 suitable for use with and/or supportive of the improved coupling/interfacing schemes and techniques in accordance with certain exemplary implementations of the present invention. Various types of computing devices may benefit from these schemes and techniques. Consequently, the term "machine" will often be used to also represent any type of device or appliance capable of implementing all or part of the schemes and techniques.

With regard to FIG. 1, computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 8. The logical connections depicted in FIG. 8 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

To support the portability of tokens and the associated cryptographic functions that support application programs 160, computer 130 further includes at least one portable token interface. For example, magnetic disk 148 or optical disk 152 may be considered a token carrier or device when encoded with applicable token data/instructions. More likely, however, in the future, the portable token interface will include the coupling of additional hardware to computer 130. Thus, for example, a smart card reader 200 may be connected to bus 136 through a port such as serial port 156, as depicted. Smart card reader 200 is supported by application programs and/or other modules similar to other input/output devices. Smart card reader 200 is configured to receive a smart card 202 and to provide the operative coupling of smart card 202 to processing unit 132. Smart card reader 200 can support a plurality of smart cards. Those skilled in the art will recognize that other types/forms of portable token and/or other like removable/non-removable processing mechanisms may employ other interface devices.

By way of still further example, a universal serial bus (USB) port 204 may also be coupled to bus 136, as applicable, to support smart card readers and/or other types of portable token devices 206. The basic notion of the portable token device is that it can be provided by the user to one or more computer systems when required to support cryptographic functions. The basic notion of the removable/non-removable processing mechanism can be the same, except that in certain implementations, the mechanism may be configured to be substantially permanent, as might be the case for a smart card that is arranged within a device or appliance by a manufacturer or other technician/administrator. One example is a subscriber card embedded within a set-top box or other device and not normally removed by a consumer.

Exemplary Portable Token And/Or other Like Processing Device

Figure 2:
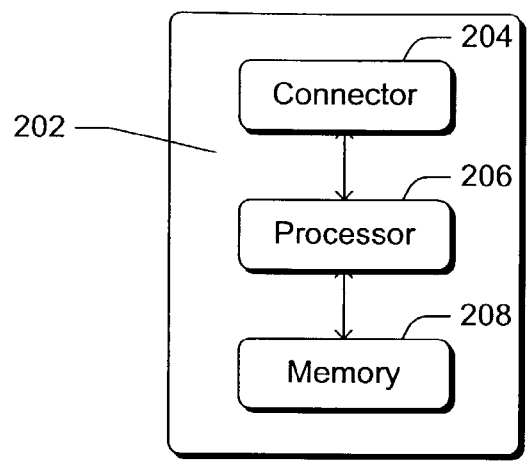
FIG. 2 is a block diagram of a smart card embodiment of a portable token device suitable for use with the computing device as depicted in FIG. 1, for example.

FIG. 2 is a block diagram depicting an exemplary smart card 202. As shown, smart card 202 includes a connector 204 coupled to an onboard controller or processor 206. Processor 206 is further coupled to an onboard memory 208. Memory 208 is typically a non-volatile memory that allows smart card 202 to be moved around from machine to machine without loss of data. Processor 206 is responsive to instructions provided via memory 208 and/or computer 130 when smart card 202 is powered on.

Given this configuration, smart cards can be configured to provide significant security for cryptographic keys. Additional security can be provided by requiring the user to enter additional security or identifying data (e.g., a personal identification number (PIN) or string, personal and/or other biometric information/data) in computer 130 when attempting to activate or otherwise access the services provided for by smart card 202. For example, the card holder may be required to enter a PIN to activate the private key, or have their fingerprint scanned. As a token carrier, for example, smart card 202 preferably holds at least one asymmetric key pair. Symmetric keys are preferably processed by the more powerful processing unit 132 of computer 130.

Problems may occur in the interface to these smart cards, since smart card developers are usually free to develop/program for their smart cards as they wish and the previously defined interfaces are complicated and prone to error. Currently, there are few standards beyond the physical interface level for smart cards. A Public-Key Cryptography Standard #11: Cryptographic Token Interface Standard, available from RSA Laboratories of Redwood City, Calif., is currently in the drafting stage to provide for the use of portable tokens. However, the proposed solutions/interface in the current draft fail to provide a clean/generic interface through the use of various objects and method invocation techniques, as described herein.

Furthermore, there appears to be a general consensus that any specified standard that goes beyond an interface level would be counter-productive to the smart card vendors, each of whom may have their own requirements, standards and practices.

In accordance with certain aspects of the present invention, the plans and/or desires of the manufacturers and implementers of such varying devices are kept in mind and supported by much needed and robustly implementable coupling/interfacing schemes and techniques. In accordance with certain further aspects of the present invention, the burden of developing significant code to support the requisite interface has essentially been shifted to the developer of the operating system and/or subcomponents thereof.

Conventional Software Architecture Solutions

Figure 3:
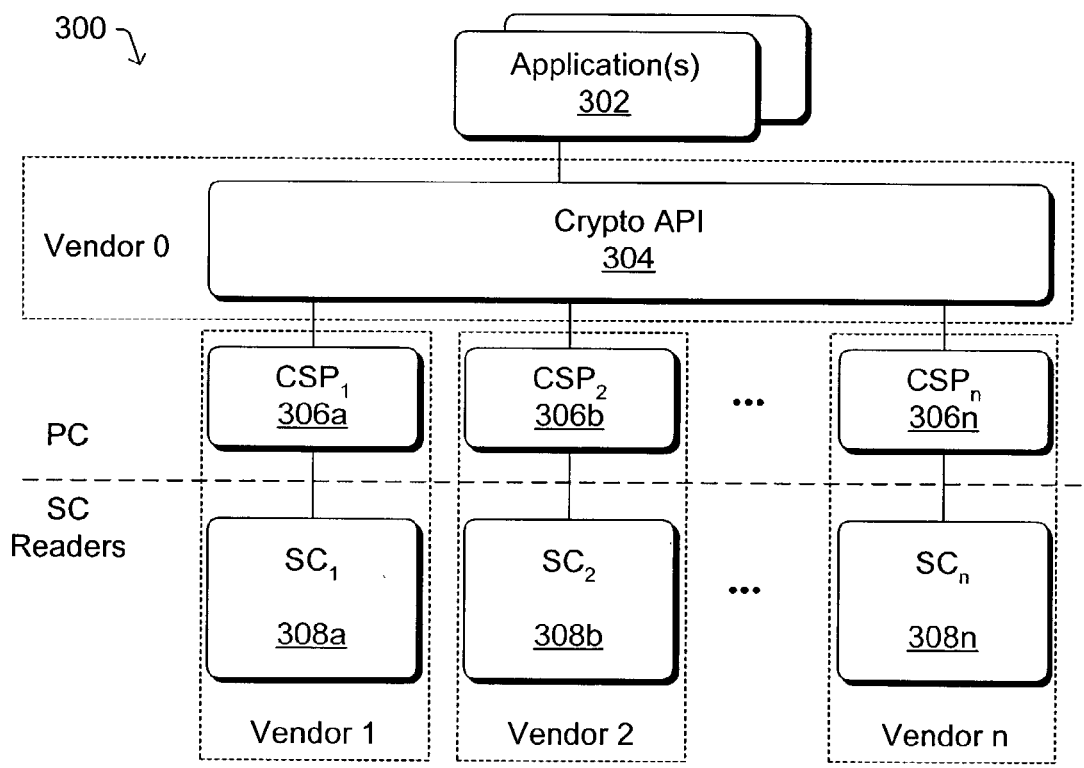
FIG. 3 is an illustrative block diagram of a conventional computer software architecture for interfacing a smart card with a computing device.

Reference is made to FIG. 3, which is a block diagram depicting an exemplary portion of a conventional software architecture solution 300 implemented to provide interfaces between one or more applications 302 and one or more smart cards 308a–n.

In this example, a conventional interface between a calling application 302 and a smart card 308a–n includes a Crypto API 304 operatively arranged to support calling application 302. The interface further includes one or more cryptographic server providers (CSPs) 306a–n. In this example, there is a corresponding CSP 306a–n for each uniquely different smart card 308a–n.

In the past, developing a reliable CSP 306a–n has proven to be extremely challenging since each smart card 308a–n requires certain data and/or data exchanges and function calls. Such efforts have been further complicated because different software developers or other like venders are usually responsible for their respective logic within the interface. Thus, for example, in FIG. 3, vender 1 is illustrated as providing smart card (SC$_1$) 308a and corresponding CSP$_1$ 306a, while vendor 0 provides Crypto API 304. Experience has shown that the burden placed on vender 1 to produce a robust CSP$_1$ 306$_a$ in light of Crypto API 304 and also other, perhaps yet to be determined, smart card readers, smart cards and corresponding CSPs can be too much.

Consequently, an analysis of the interface operations and the functionality of a variety of smart cards and other like devices have resulted in an improved design that substantially reduces that burden placed on the smart card vendors. Moreover, the resulting coupling/interface schemes and techniques as presented herein provide for a more standardized or generic interface, rather than a plurality of special/limited-purpose interfaces.

Improved Software Architecture Solutions

Figure 4:
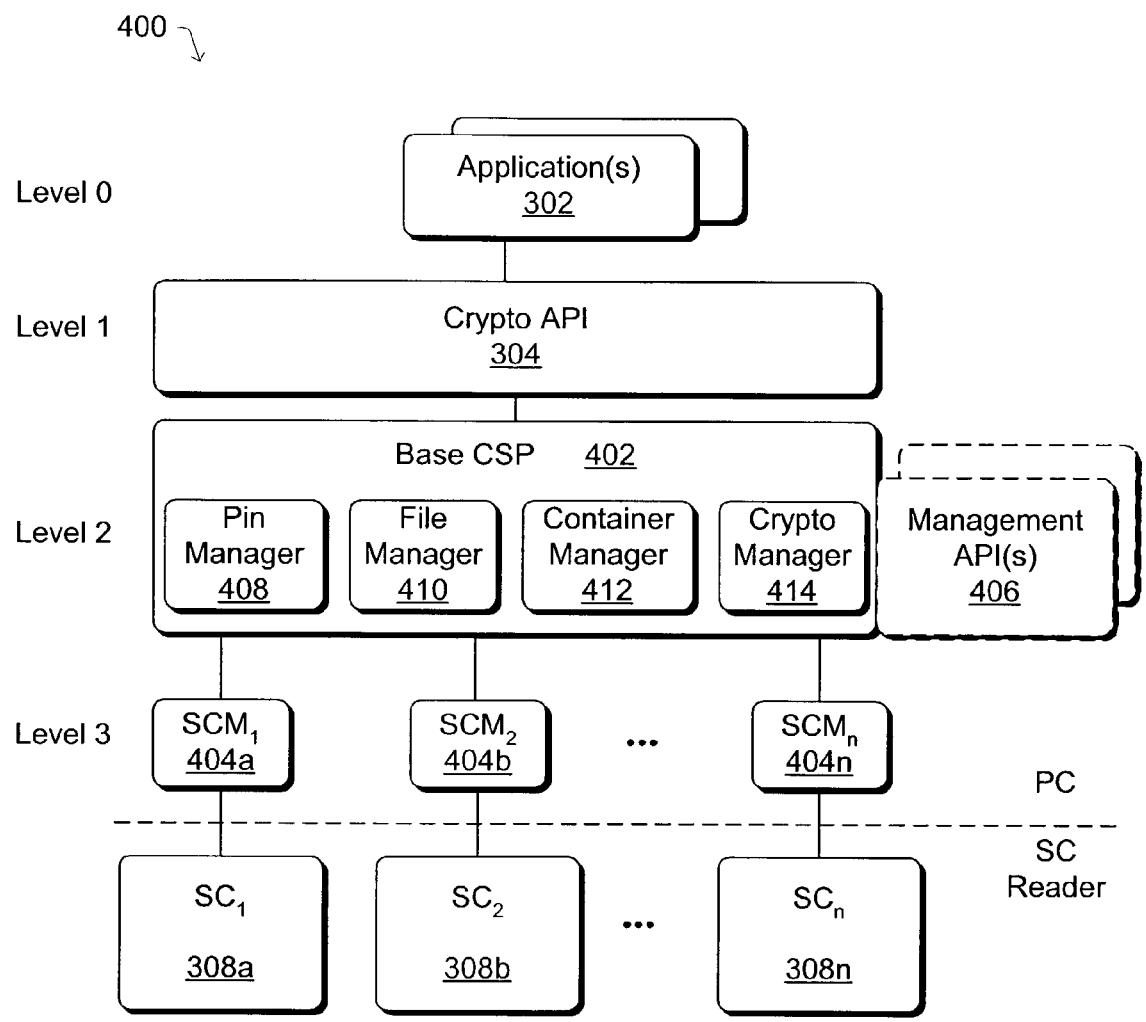
FIG. 4 is an illustrative block diagram of an improved computer software architecture for interfacing smart cards and other like devices with a computing device, in accordance with certain exemplary implementations of the present invention.

Reference is now made to FIG. 4, which is a block diagram depicting an improved software architecture 400, an accordance with certain demonstrative implementations of the present invention.

Here, software architecture 400 includes one or more applications 302 configurable to request and/or call upon the service(s)/function(s) of one or more smart cards (SCs) 308a–n and/or other like devices. As in FIG. 3, an application 302 is operatively coupled to Crypto API 304. Operating between Crypto API 304 and SCs 308a–n, is a base-CSP 402 and, as needed, one or more smart card specific modules 404a–n. Additionally, in this implementation, one or more management APIs 406 is included with base-CSP 402.

In accordance with certain exemplary aspects, the functionality provided by base-CSP 402 includes one or more interface support functions that are common for at least a portion of the SCs 308a–n. By way of example, in certain implementations base-CSP provides/supports at least four common interface support activities, namely, PIN management, file management, container management, and cryptography operation. These interface support activities can be considered to represent "generic categories" since each of the SCs 308a–n will at some point be involved in a process requiring such activities and/or interface functionality.

Accordingly, in FIG. 4, base-CSP 402 includes PIN manager 408, file manager 410, container manager 412, and cryptography manager 414 capabilities. These managing modules are configured to provide a well-defined interface that the smart card vendors can more easily interact with and derive benefits from. Thus, in accordance with certain implementations of present invention, base-CSP 402 is configured to act as a "mini-driver" that is operatively supportive of the cryptography and other functions, such as, for example, data storage provided by the smart card as well the functioning of Crypto API in discovering and accessing the smart card and its capabilities.

With PIN manager 408, file manager 410, container manager 412, and/or cryptography manager 414, base-CSP 402 exposes the various applicable features that a smart card 308a–n can provide. Both Crypto API 304 and smart cards 308a–n, regardless of their developer, vender, etc., will have a defined set of interface functions provided by base-CSP 402. Within a modular logic arrangement, each new/different smart card 308a–n that is added will only need only now how to make use of the common functionality exposed by base-CSP 402. At most, smart cards 308a–n need only provide a smart card specific module that translates or otherwise processes, as needed, the exchanged information between the smart card logic and base-CSP 402. Moreover, in accordance with certain implementations of the present invention, base-CSP can be designed such that Crypto API 304 need not change significantly or at all. Furthermore, one or more card management APIs 406 can be implemented to provide new/additional support for smart cards 308a–n and in some cases Crypto-API 304.

PIN manager 408 is configured to support identity functions, such as, for example, logon operations wherein a user inputs the requisite information to satisfy the smart card that the user is authorized to use the smart card. Thus, for example, in certain implementations the base-CSP will support the reception/processing of a user's PIN or other like information, such as certificates, RSA calls, etc., that can be used to authenticate the user. By way of example, the PIN can be used to authenticate the user to the card. Once authenticated to the card, the user can then make use of an RSA private key on the card to authenticate himself to the system. Typically, the certificate is also required for the user to authenticate himself to the system. It is therefore convenient to store the certificate on the smartcard. These and other various trusted authentication techniques and the like are well known, and as such a detailed description of them falls outside the scope of this document.

Hence, PIN manager 408 can be configured to assist Crypto API 304 in developing a cryptographic association or context that subsequently allows an application 302 to take advantage of the cryptographic and other capabilities provided by a smart card 308a–n. To accomplish such functions and/or others, PIN manager 408 may include one or more APIs.

File manager 410, in accordance with certain exemplary implementations of the present invention, is configured to provide applications 302 with the ability to discover and/or otherwise access memory 208 (see, e.g., FIG. 2) and the data files and/or file structure(s) provided therein. In most instances, smart card 308a–n will likely be able to allow/ disallow such access to all or selected portions of the memory and/or data files stored therein. In certain implementations, such configurations may include specific file access permissions, such as, read, write, and/or erase permissions as is common with many operating systems. Accordingly, to accomplish such functions and/or others file manager 410 may include one or more APIs.

In accordance with certain implementations of the present invention, container manager 412 is configured to provide discovery, access and/or control over containers and/or their contents or other container related information associated with a smart card 308a–n and maintained, at least temporarily, in memory 208. As used herein, the term container generally refers to one or more objects typically provided in an object-based or other like logic design (e.g., software programming methodology). Containers typically logically contain one or more objects. Containers may be empty at times. Containers may also contain other containers. Container manager 412 can support application 302, Crypto API 304, and/or the smart card in performing such container activities. For example, containers may be used to store pairs of public/private keys. This is often referred to as a Key Container. Content file manager 412 may include one or more APIs.

In certain other implementations, additional management APIs 406 are provided to allow the smart card (or other like device) to manage its logic, functions, data storage, containers, certificates, keys, etc. Such additional and optional APIs may be specifically configured to support one or more smart cards.

Cryptography manager 414, in accordance with certain exemplary implementations of the present invention, is configured to provide interface support for cryptographic operations. By way of example, cryptography manager 414 can be configured to support data encryption, decryption, hashing, message digest, signing, and the like, by the cryptography logic of a smart card 308a–n, which may utilize one or more key pairs, algorithms, certificates, etc. Cryptography manager 414 may also include one or more APIs.

Exemplary Smart Card Interface Arrangement

This section provides additional exemplary implementation details in accordance with certain further implementations of the present invention. The intent here is not to limit the scope of the invention, but rather to introduce certain implementation-specific features and techniques that may be adapted in still other implementations.

With this in mind, exemplary schemes and techniques are provided for use with the Microsoft® Windows® operating system and the Crypto API provided therein. Here, a base-CSP is provided to operate with the Crypto API and, as needed, one or more smart card specific modules. In accordance with certain further exemplary implementations, optional smart card management API's are also described. In certain implementations, it is recognized that one or more of these smart card management API's may also be beneficial exclusive of the base-CSP.

Basic design goals for this and other like arrangements are to provide significant performance, security, and robustness of the smart card or other like processing/logic configuration. In this example, the base-CSP and/or management APIs are designed to provide a foundation that either completely or substantially supports the operative coupling/interface needs of the smart card, the Crypto API, and calling applications. As mentioned above, the base-CSP and management APIs advantageously provide the necessary support for certain functions/capabilities that are common and/or expected to be common across most if not all of the various types of smart cards and/or other like devices that may need to support applications via the Crypto API.

In this example, the Crypto API is abstracted out of the smart-card-specific functionality. Thus, Crypto API forms a first level in the application-smart card interface. Certain API's, for example, are provided at this level to fully support the various smart card or other like device usage scenarios. The base-CSP forms a second level in this exemplary application-smart card interface. In certain implementations, the smart card management APIs also reside on this second level. The third level of the application-smart card interface includes, as needed, one or more smart card-specific modules. Here, the smart card specific modules are likely to be abstracted out of vendor and card-specific implementation dependencies. Such smart card specific modules may, for example, be defined by one or more card-specific APIs.

In this example, common smart card functionality includes private key storage (for at least one private key) that is likely to be pin-protected. The private key can be stored in this manner within a "default" key container. As implemented in this example, if only one key is provided/allowed, it will be of type Key Exchange. The smart card functionality will also include storage for at least one smart card logon certificate. Here, for example, the certificate can be public-readable and pin write-protected.

Common smart card functionality also includes, in this example, support of multiple certificates and/or keys. Multiple private keys may also be stored. Each private key can have an associated key container name, although it may prove useful to provide a "default" key container. Each private key can have a set of properties associated with it, such as, for example, a key type (e.g., signature, key exchange, etc.). Other exemplary key properties include a key lifetime, key size, and/or identifying information for the associated certificate and public key.

Multiple certificates can be stored, possibly with different usages. In certain implementations, it may be desirable to support multiple certificates per private key. Each certificate can have identifying information essentially linking it to an associated private key.

Common functionality may also include a root certificate that can be stored in the public data portion of the smart card. Access to this root should be the same as access to the user's public certificate data. The root certificate can be the user's main trust point, such as a Microsoft Root, or a Visa Root, etc. Such functionality can be useful in an environment in which the user profile, and therefore the user's root store, is not available or not modifiable by the user. One example is a server authentication at a kiosk.

Generic certificate store functionality may also be common on the smart cards. This may prove to be more useful as general card storage grows. A user may decide to keep the entire Root Store on the card, for instance, or some CA (Certificate Authority) certificates.

Data redirection is also another potential common function. Here, for example, a public data portion on the smart card may include a URL or the like identifying the remainder of the user's personal data. Interesting uses for this functionality include centralized storage for user data. Here, this may include the user's certificates, "lesser" private keys encrypted with a key stored on-card, address book data, etc.

To better understand the Crypto API behavior and the needs met by application-smart card interface arrangement 500, it is useful to consider the usage scenarios associated with the smart cards. The following card usage scenarios are based on base-CSP traces from performing each smart card user operation on a client device.

Two exemplary scenarios include a smart card logon and a smart card user enrollment. Each trace below consists of the Crypto API calls used in the given scenario, followed by a smart card operation, if any, would result from the API call.

Begin Logon process:

CryptAcquireContext   CRYPT_MACHINE_KEYSET, CRYPT_SILENT - Implies that no caching should be used, and that no UI should be displayed.
        -- CardReadFile (General_Data_File) - read the globally unique identifier (GUID) of the default container.
    CryptGetUserKey AT_KEYEXCHANGE
        -- CardGetContainerInfo ( GUID ) - verify that the container indicated by the GUID holds a key-exchange key.
    CryptGetKeyParam KP_CERTIFICATE
        -- CardReadFile ( "UserCert/GUID" )
    CryptGetProvParam PP_CONTAINER
    CryptGetProvParam PP_NAME
    CryptAcquireContext   CRYPT_MACHINE_KEYSET, CRYPT_SILENT
        -- use the cached data, since this container has already been opened
    CryptGetProvParam PP_ENUMALGS
        -- CardEnumKeySizes
    CryptSetProvParam PP_KEYEXCHANGE_PIN
        -- CardSubmitPin
    CryptCreateHash CALG_MD5
    CryptHashData
    CryptSignHash AT_KEYEXCHANGE
        -- CardPrivateKeyDecrypt ( GUID, Data )
    CryptGetHashParam HP_HASHVAL
    . . .
    CryptSetHashParam HP_HASHVAL
    . . .
    CryptImportKey SIMPLEBLOB (CALG_RC2)
    CryptSetKeyParam KP_EFFECTIVE_KEYLEN
    CryptSetKeyParam KP_IV
    CryptDecrypt (CALG_RC2)
    CryptGenRandom
    CryptCreateHash CALG_SHA1
    . . .

Begin Certificate Propagation process:

CryptAcquireContext CRYPT_SILENT
        -- use cached data
    CryptGetProvParam PP_CONTAINER
    CryptGetUserKey AT_KEYEXCHANGE
        -- use cached data
    CryptGetKeyParam KP_CERTIFICATE
        -- use cached data
    CryptGetUserKey AT_SIGNATURE
        -- This call will fail, based on the cached data in the base-CSP. The type of key in this container is already known, and it's not the Signature.
    CryptDestroyKey
    CryptDestroyHash
    CryptReleaseContext
    Pin Change
    . . .
    Pin Submittal
    CryptAcquireContext for card access (likely using CRYPT_SILENT)
    CryptSetProvParam       KP_ADMIN_PIN, KP_KEYEXCHANGE_PIN, or KP_SIGNATURE_PIN
    Card Un-block
    . . .

User Enrollment:

CryptAcquireContext CRYPT_VERIFYCONTEXT
        -- Implies that no access to keys is required and that no UI should be displayed.
    CryptGetProvParam PP_KEYSPEC
        -- Supported public key types should be per base-CSP data, and not per-smart card data.
    CryptAcquireContext CRYPT_VERIFYCONTEXT -continued CryptGetProvParam PP_ENUMALGS_EX
        -- CardEnumKeySizes - The Verify-Context semantics should allow access to public card data.
    CryptAcquireContext CRYPT_NEWKEYSET
        -- CardQueryFreeSpace
        -- The NEWKEYSET call will also cause a new GUID-name to be generated for this container.
    CryptGetProvParam PP_NAME
    CryptGetProvParam PP_UNIQUE_CONTAINER
        -- Returns the GUID created above.
    CryptGetProvParam PP_PROVTYPE
    CryptGetUserKey AT_KEYEXCHANGE - call fails
    CryptGenKey AT_KEYEXCHANGE
        -- CardCreateContainer ( GUID, KeyGen, Key-Exchange )
        -- CardWriteFile ( General_Data_File ) - write the GUID of the new container as the default.
    CryptGetUserKey AT_KEYEXCHANGE
        -- Succeeds using cached data. It is known from the previous CryptGenKey that this container holds a Key Exchange key.
    CryptExportKey PUBLICKEYBLOB
    . . .
    CryptCreateHash CALG_SHA
    CryptHashData
    CryptSignHash AT_KEYEXCHANGE
        -- CardPrivateKeyDecrypt ( GUID, Data )
    . . .
    CryptAcquireContext
        -- CardReadFile (General_Data_File ) - read the GUID of the default container.
    CryptGetProvParam PP_NAME
    CryptGetProvParam PP_UNIQUE_CONTAINER
    CryptGetProvParam PP_PROVTYPE
    CryptGetUserKey AT_KEYEXCHANGE
        -- Succeeds using cached data. It is already known that the container referenced by this GUID contains a Key-Exchange key.
    CryptSetKeyParam KP_CERTIFICATE
        -- CardWriteFile ( UserCert, GUID )
    CryptDestroyKey
    CryptReleaseContext Digital Signature CryptAcquireContext CRYPT_VERIFYCONTEXT
    CryptAcquireContext
    CryptGetProvParam PP_ENUMCONTAINERS
    CryptGetUserKey AT_KEYEXCHANGE, AT_SIGNATURE
    CryptExportKey PUBLICKEYBLOB
    CryptCreateHash CALG_SHA1
    CryptHashData
    CryptGetHashParam HP_HASHVAL
    CryptDestroyHash
    CryptReleaseContext
    Pin Cache
    . . .

Exemplary Crypto API Operations
    CPAcquireContext

In certain implementations, AcquireContext calls result in calls to CSPQueryCapabilities, CSPQueryFreeSpace, and CSPQueryKeySizes functions in order to cache such data as early as possible. In the following exemplary scenario, once a smart card with the specified container is found, then a new HCRYPTPROV is created with user's context data, such as, e.g.: context flags; a container name; a serial number of the corresponding smart card; a pointer to the smart card cached data; smart card selection heuristics; and/or container specification levels.

In response to a CryptAcquireContext call, the base-CSP attempts to match the container specified by the caller to a specific card/reader. The caller can provide a container name with varying levels of specificity, for example, as shown in the following list, which is sorted from more-specific to less-specific requests: reader name and container name;

reader name and default container (e.g., NULL); container name only; and/or default container (e.g., NULL) only. In general, for the first two cases, in which a reader name is provided, the base-CSP will search for the specified reader and perform the requested operation on the smart card inserted in that reader. For the second two cases, in which a reader name is not provided, the base-CSP will perform an ordered search for a card/reader suitable for the current request, beginning with smart cards already known to the base-CSP and continuing to all smart cards/readers currently known. For each of the above cases, the base-CSP can be configured, for example, to search for a matching smart card in a list(s) of cached card data. Thus, such a cache may include a list of smart cards and associated card state information that the base-CSP has encountered to-date. In general, if a matching smart card is found in the cache, then the smart card handle associated with the cache item can be tested. This is one way to determine if the smart card is still in the reader.

Container Operations

In this exemplary implementation, container operations can be requested via CryptAcquireContext. For example, container operations may include create a new container (CRYPT_NEWKEYSET), open an existing container, and/or delete a container (CRYPT_DELETEKEYSET). The heuristics used to associate a user context with a particular smart card and reader can be based on the container operation requested and type or level of container specification used.

Here, the container creation operation can be restricted, for example, as follows:

No Silent context—the key container creation must always be able to show user interface (UI), such as, e.g., a pin prompt.

No overwriting existing containers—If the specified container already exists on the chosen smart card, either chose another smart card or fail the operation (this can depend on the Card Specification type or level).

The following exemplary Context Flags may be employed:

CRYPT_SILENT—here, for example, no UI is displayed during this operation.

CRYPT_MACHINE_KEYSET—no cached data is used during this operation, for example.

CRYPT_VERIFYCONTEXT—e.g., only public data may be accessed on the card

In addition to Container Operations and Container Specification, other user options must be considered during card selection, such as the above CryptAcquireContext flags.

Card Selection Behavior

In certain exemplary scenarios, the user is prompted to insert a smart card. If the user context is silent, this operation fails and no UI is displayed. Otherwise, in response to the UI, the user may either insert the smart card, or perhaps click Cancel. If the user Cancels, then the operation fails.

With some container specifications, the complexity of the smart card selection process can be reduced since only the smart card in the named reader can be considered a match. Thus, for example, the base-CSP would find the requested reader. If it cannot be found, then the process fails. If there is no smart card in the reader, then the base-CSP may be configured to prompt the user, e.g., via a UI, to insert the smart card.

Once a smart card is inserted in the reader and operatively connected, then base-CSP can assist in determining the name of the default container on the chosen smart card. Exemplary container operations include, for example, opening an existing container, deleting a container, and/or finding a specified container. If the specified container cannot be found on the smart card then again the user may be prompted in some manner to insert a card. If, when creating a new container, the specified container already exists on the smart card, then the process will fail.

In accordance with certain further aspects of the present invention, the base-CSP can configured to match an appropriate smart card with a user context. This can be beneficial, since there may be multiple cached smart cards that meet the provided criteria.

In certain implementations, each smart card known by the base-CSP is stored in some manner (e.g., a list of already-accessed cards may be cached process-wide). To open an existing container the base-CSP will look for the identified (e.g., named) container in the smart card's cache of container names. The container name could be a GUID or NULL, specifying the default container. An operation should be attempted on the cached SCARDHANDLE to verify its freshness.

If a cached card has been removed and the context is determined to be SILENT, then base-CSP may continue searching for another matching smart card. If a cached smart card has been removed and the context is non-Silent, then a UI may be displayed prompting the user to insert a smart card. If the user clicks Cancel within the UI, then the base-CSP may continue searching for a matching card. If a matching card is not found in the base-CSP cache, a SCardUID1gSelectCard( ) call, for example, can be used with an appropriate callback filter to find a matching card with the requested container. The callback provided to SCardUID1gSelectCard would create base-CSP cache entries for each card enumerated.

The callback should create a new smart card cache entry for each encountered smart card and stick it in the base-CSP's global list or other like data structure. In the card cache structure a new card-specific data structure may be created to hold the provided SCARDHANDLE and a new PIN cache handle.

In this exemplary arrangement, no CRYPT_SILENT is allowed on container creation if the user is to be prompted for a PIN. Here, a card selection UI may be necessary. For other operations, the calling function may be able to acquire a "verify" context against the default container and then make a CryptSetProvParam call to cache the user PIN for subsequent operations. However, in the container creation case there may not already be a container against which to perform such an operation.

For each card already known by the base-CSP, the stored SCARDHANDLE is refreshed. The following checks may also be made: if the smart card has been removed then continue the search; if the smart card is still present but already has the named container then continue the search; if the smart card is available, but a call to CSPQueryCardFreeSpace indicates that the card has insufficient storage for an additional key container then continue the search; otherwise, the first available smart card meeting the above criteria can be used for the container creation.

If a matching smart card is not found in the base-CSP cache, then a callback used to filter enumerated cards may be employed verify that a candidate smart card does not already have the named container and that CSPQueryFreeSpace indicates that the card has sufficient space for an additional container. If no suitable card is found then UI can be displayed prompting the user to insert a smart card.

If, when attempting to delete a container, the specified container name is NULL, then the process will fail. This can be considered an ambiguous case when a particular reader is not specified.

For each smart card already known by the base-CSP, the stored SCARDHANDLE can be refreshed and the following checks made: if the smart card does not have the named container then continue the search; if the context is SILENT and the smart card has the named container but has been removed then the search fails; if the context is non-Silent and the smart card has the named container but it has been removed then UI can be displayed prompting the user to insert a smart card; if a matching smart card is not found in the base-CSP cache then a callback used to filter enumerated cards can be used to verify that a candidate card has the named container; if the context is non-Silent and no suitable smart card is found then UT can be displayed prompting the user to insert a smart card; otherwise the process fails.

In accordance with certain implementations of the present invention, the following APIs are defined:
—BOOL CPAcquireContext(
—HCRYPTPROV *phProv,
—CHAR *pszContainer,
—DWORD dwFlags,
—PVTableProvStruc pVTable);
phProv
Initialize as a PCSP_PROV_CTX.
pszContainer Calling functions can specify either a Fully Qualified container location or a simple container name, for example. The former can include both a reader name and a container name. The base-CSP can be configured to use different semantics for locating a suitable card depending on the presence of a fully qualified container.

```
dwFlags
    CRYPT_NEWKEYSET,CRYPT_VERIFYCONTEXT,CRYPT_
MACHINE_KEYSET, etc.
    pVTable
    Defined in wincrypt.h.
    typedef struct_VTableProvStruc {
        DWORD       Version;
        CRYPT_VERIFY_IMAGE_A FuncVerifyImage;
        CRYPT_RETURN_HWND   FuncReturnhWnd;
        DWORD       dwProvType;
        BYTE        *pbContextInfo;
        DWORD       cbContextInfo;
        LPSTR       pszProvName;
    } VTableProvStruc,        *PVTableProvStruc;
CPGenKey
Key Pair Creation
Verify that the caller's request is valid.
```

Key Type—Supported key types are AT_SIGNATURE and AT_KEYEXCHANGE.

Key Size—Call CSPEnumKeySizes( ) and verify that the specified key size is valid. If no key size is specified then the default key size returned by that function can be used.

Key Container—If the container specified in the user context already exists and has a key of the requested type and the context is SILENT, then the process fails. Otherwise, UI can be displayed for the user to confirm the key replacement. Then CSPCreateContainer( ) can be called, specifying the key-creation flag, container name, and key size, for example.

```
API Definition
BOOL CPGenKey(
    HCRYPTPROV hProv,      // in
    ALG_ID Algid,          // in
    DWORD dwFlags,         // in
    HCRYPTKEY *phKey       // out
);
CPSetKeyParam
Present User Pin
KP_KEYEXCHANGE_PIN
KP_SIGNATURE_PIN
KP_ADMIN_PIN
Write Certificate
KP_CERTIFICATE
API Definition
BOOL CPSetKeyParam(
    HCRYPTPROV hProv,      // in
    HCRYPTKEY hKey,        // in
    DWORD dwParam,         // in
    BYTE *pbData,          // in
    DWORD dwFlags          // in
);
CPGetKeyParam
Read Certificate
KP_CERTIFICATE
API Definition
BOOL CPGetKeyParam(
    HCRYPTPROV hProv,      // in
    HCRYPTKEY hKey,        // in
    DWORD dwParam,         // in
    BYTE *pbData,          // out
    DWORD *pdwDataLen,     // in, out
    DWORD dwFlags          // in
);
```

Smart Card Interface Layer

In accordance with certain aspects of the present invention, the PCSC and Cryptographic associations are abstracted to this level, wherein card data caching and logical card file-system format can be handled.

Smart Card Interface Operations

One purpose for having Smart Card Interface operations is to create a tight coupling between the Card Specific operations and the function calls to be made directly by the base-CSP. In certain instances, the Card Interface operations: remove as much general code from the Card Specific operations as possible; and serve as a caching layer for Card data. In general, any data that can be read off the smart card can be stored in the base-CSP process. On subsequent requests for that data, the cached copy will be checked for freshness and then used, if appropriate. The Smart Card Interface operations will only call the Card Specific operations if cached data is not available. This is advantageous because communication with the smartcard tends to be quite slow. On the other hand, it is critical that the validity of any cached data be verified before it is used. Otherwise, the security of the smartcard-based authentication may be compromised. The cache freshness check solves this problem.

Enumerate Certificates—

In certain implementations, the base-CSP can be configured to specify container identification in a "Read Certificate" operation and locate the corresponding cert. In this case, there is no certificate enumeration, just container enumeration. Of course, not all containers will have a certificate. It may be desirable to share a key between two or more certificates. That is why it may be necessary to support certificate enumeration in addition to container enumeration.

Certificate enumeration may be accomplished, for example, via a CSPEnumFiles call, by specifying the "User- Cert" prefix in the file filter. For the certificate, if any belong to the default key container then the certificate filename GUID can be the same as the GUID name of the container. For certificates in general, the name of the corresponding key container can be included in the stored certificate data in order to support multiple certificates per key. However, a certificate and its key container need not always share the same GUID name.

Exemplary Smart Card Capabilities
CSPQueryCapabilities
DWORD CSPQueryCapabilities(
—IN OUT PCARD_CACHE pCardCache,
—IN OUT PCARD_CAPABILITIES pCardCapabilities);
Key Containers Key container names can be specified as logical card filenames. That is, Fully Qualified container names, those that specify both a reader name and a container name, should not be passed to the Card Interface functions. The container name portion of a fully qualified name can be passed, since each applicable API can be configured to receive the smart card context information.

CSPEnumContainers
DWORD CSPEnumContainers(
—IN OUT PCARD_CACHE pCardCache,
—IN DWORD dwFlags,
—OUT LPSTR pszContainerName);
CSPDeleteContainer
DWORD CSPDeleteContainer(
—IN OUT PCARD_CACHE pCardCache,
—IN DWORD dwReserved,
—IN LPSTR pszContainerName);
CSPCreateContainer(
DWORD CSPCreateContainer(
—IN OUT PCARD_CACHE pCardCache,
—IN LPSTR pszContainerName,
—IN DWORD dwFlags,
—IN DWORD dwKeySize,
—IN PBYTE pbKeyData);
CSPGetContainerInfo
DWORD CSPGetContainerInfo(
—IN OUT PCARD_CACHE pCardCache,
—IN LPSTR pszContainerName,
—OUT PCONTAINER_INFO pContainerInfo);
Pin
CSPSubmitPin
DWORD CSPSubmitPin(
—IN OUT PCARD_CACHE pCardCache,
—IN LPSTR pszUserId,
—IN DATA_BLOB *Pin);
CSPChangePin
DWORD CSPChangePin(
—IN OUT PCARD_CACHE pCardCache,
—IN LPSTR pszUserId,
—IN DATA_BLOB *CurrentPin,
—IN DATA_BLOB *NewPin);
Public Data
CSPReadFile
DWORD CSPReadFile(
—IN OUT PCARD_CACHE pCardCache,
—IN LPSTR pszFileName,
—IN DWORD dwReserved,
—IN OUT DATA_BLOB *FileContents);
CSPWriteFile
DWORD CSPWriteFile(
—IN OUT PCARD_CACHE pCardCache,
—LPSTR pszFileName,
—DWORD dwFlags,
—IN DATA_BLOB *FileContents);
CSPDeleteFile
DWORD CSPDeleteFile(
—IN OUT PCARD_CACHE pCardCache,
—IN DWORD dwReserved,
—IN LPSTR pszFileName);
CSPEnumFiles
DWORD CSPEnumFiles(
—IN OUT PCARD_CACHE pCardCache,
—IN DWORD dwFlags,
—IN OUT LPSTR pszFileName);
CSPQueryFreeSpace
DWORD CSPQueryFreeSpace(
—IN OUT PCARD_CACHE pCardCache,
—IN DWORD dwReserved,
—IN OUT PCARD_FREE_SPACE pCardFreeSpace);
Exemplary Cryptographic Operations IN accordance with certain implementations, data padding may employed. An RsaEncrypt-like function may be used to handle data padding and dispatch to the smart card, or to extract the requested public key from the smart card. If the smart card supports exporting the public key, then the base-CSP may be configured to support RSA encrypt operations, curve-based encrypt operations, and/or the like, for example. In accordance with certain exemplary implementations, the base-CSP does not "support" cards that don't support exporting the public key. Here, public keys could then be cached with their respective container data.

```
CSPRsaDecrypt
DWORD CSPRsaDecrypt(
    IN OUT PCARD_CACHE pCardCache,
    IN LPSTR pszContainerName,
    IN DWORD dwReserved,
    IN OUT PBYTE pbData);
CSPQueryKeySizes
DWORD CSPQueryKeySizes(
    IN OUT PCARD_CACHE pCardData,
    IN DWORD dwKeySpec,
    IN DWORD dwReserved,
    OUT PCARD_KEY_SIZES pKeySizes);
```

Card Interface Caching

In certain implementations, a "write-through" caching scheme is employed since the smart card is removable. With this scheme the last writer wins. The base-CSP should never be required to fail write operations due to data inconsistency. For example, a process A may have written an item X to the smart card since a process B last read X. Process B may subsequently write X, which will render the cached X in Process A inconsistent. To mitigate, the cache should have a timeout (stale) to help ensure that readers get consistent data. It may be possible to use different timeouts for different types of data.

Cache implementation can be based on a set of counters, for example, stored in a well-known on-card location. The counters can be incremented by the base-CSP, which is doing the write operation. The value of the counter will identify the last modification to the state of the card correctly reflected by cached data. For simplicity, modifications can be tracked with limited granularity. By way of example, the following card areas, each as a whole, can be tracked by the cache: [Containers|Data Files|Pins].

In another example, when a process modifies any smart card data file, an on-card "Data Files" cache location can be updated with a current timestamp. Any subsequent read operation from any other process for any data file will be a cache miss. This means that the requested file will have to be read directly from the card, even if it is already correctly cached, if another on-card file has been modified since the last operation.

The well-known on-card cache location can be a special data file with a pre-determined name. Thus, for example, cache state updates can be via CardReadFile and CardWriteFile operations using this well-known file name. To reduce the amount of card interaction required to correctly maintain the cache state, the cache data can be stored in its own logical file without any other data. This will allow the base-CSP to read and write the minimum necessary amount of data from the card to maintain the cache state.

In accordance with certain implementations of the present invention, the contents of the card cache file are in a pre-defined structure. Upon smart card removal, smart card cache can safely be persisted in the process that has loaded the base-CSP if the smart card has been initialized with a serial number, for example. Upon smart card reinsertion, the already cached data can then be considered fresh if the smart card serial number matches and the cache file indicates no change.

Initialization

As an optimization to improve response time during important operations such as Logon, certain data can be pre-read from the smart card and cached. For example, such caching can occur during calls to CryptAcquireContext. Examples of smart card data to pre-read include the contents of any well-known card data files, which might contain the card serial number and default container name. Thus, for example, it may be advantageous to read any of the user's certificates from the card at this time, since certificates are often one of the larger data items stored on the smart card. Indeed, in certain implementations, doing so may speed up logon quite a bit. Card clients such as a user-logon or authentication process (for example, Winlogon) can judiciously use this mechanism to pre-load a user's smart card data while the user is entering a PIN, for example.

Data Writing

Cache updates can be transaction based and occur in the same transaction s as the immediately prior operation, which is necessitating a cache update. Currently, smart card transaction is technically a misnomer, since the implementation is typically a mutex that cannot be rolled-back; however, both the cache state update and the card data update, in that order, should occur before the mutex is released. An example of this follows, in which the base-CSP is writing a general data file called Foo to the card.

```
    ++pCacheData->cGeneralData
    Begin Transaction
        dwSts = CardWriteFile(pCardData, CacheFile, 0,
pCacheData)
        dwSts = CardWriteFile(pCardData, "GeneralData\Foo", 0,
file_contents)
    End Transaction
```

Data Reading

At each read request from the base-CSP to the smart card, the CacheFile can read from the card. If the data area in question has not been modified (e.g., is not marked dirty), the read request can be satisfied with cached data, if possible. If the data area in question is dirty, or the requested data is not cached, the card-read may actually take place and the results cached.

By way of example, in certain implementations, the functions in the smart card can be configured to perform the following acts when called. These acts serve the purpose of ensuring cache integrity and tend to reduce the number of calls to the smart card.

a) Look up the cached item that the base-CSP created for the smart card in question.
b) If no such item exists, fIsCached=False.
c) Otherwise, fIsCached=True. Get the item's Cache Stamp, call it myCacheStamp.
d) Begin Transaction on this SCARDHANDLE
e) Read the Cache File using CardReadFile( ).
f) Determine which value in the cache file corresponds to the desired card data item (Containers, General Data, or Pins)—call this currentCacheStamp.
g) If fIsCached is False OR currentCacheStamp>myCacheStamp, then read the requested data item from the smart card via the appropriate Card Specific module (e.g., API).
h) Otherwise, use the cached data.
i) End Transaction on this SCARDHANDLE.
j) If the item had to be read from the smart card, update the cache with the new data; and, associate currentCacheStamp with the new data.
k) Return the requested data to the caller.

Smart Card Caching Scenarios

Across a session, it may be prudent to only have about the minimum amount of data read from the smart card. That means that no unchanged data should be read from the smart card twice. Rather, unchanged data should always be retrieved from the base-CSP card data cache. Here, for example a session may be considered to be the lifetime of a process that loads the base-CSP and performs operations on a given smart card.

Throughout a session, the smart card cache will stay substantially consistent. That is, when the exemplary base-CSP is used, it should not possible to read incorrect, out of date, data from the cache. This should be true even when other processes are accessing the same smart card.

Scenario #1—Initial CryptAcquireContext for User Logon
  Inputs:
  Named Reader
  Default Container
  Search the list of cached smart cards. None are found.
  Enumerate smart cards via SCardUID1gSelectCard( ). The callback passed to this API will filter on the reader name.
  A CARD_DATA structure is created for this card and added to the list of cards known by the base-CSP. This is the first item in the CSP's card list cache.
  Call CSPReadFile( ) for the Serial Number of this card. This results in a call to CardReadFile( ) since no serial number is already cached.
  Call CSPReadFile( ) for the name of the default container of this card. This results in a call to CardReadFile( ) since no container information is already cached.
  Call CSPGetContainerInfo( ) for this container. This results in a call to CardGetContainerInfo( ) since the container information currently cached is the name of the container.

Scenario #2—Second CryptAcquireContext for User Logon
  Inputs:
  Named Reader
  Named Container Search the list of cached cards for the named container. It is found in the cache. Test the cached SCARDHANDLE to verify it's still valid.

Call CSPReadFile( ) for the Serial Number. A cached value is found. The cache read process will verify that the cached data is up to date based on the cache stamp for this item. In certain implementations, this value from the card can be reread as a sanity check. This may not be necessary if a GUID container name has already been matched.

Call CSPGetContainerInfo( ) for the specified container name. Cached data is found. The cache read process will verify that the cached data is up to date.

File Format

A fully qualified logical file name, for example, the type that will be based between the base-CSP and the smart card specific modules, can consist of a logical directory name followed by a logical file name. Thus, in this example, the pattern would be "DirName/FileName." Here, the smart card specific module will need to map logical file names to physical card locations.

Exemplary Logical Directory Names

The following logical directory names can be pre-defined: RootCert, UserCert, and GeneralData Exemplary Logical File Names A well-formed logical file name adheres may follow these rules:

For user certificates, the logical file name is composed of a GUID, plus a few bytes of identifying information. That comes to about 37+3=40 bytes maximum.

For root certificates, the logical file name is composed of the hash of the public key. This facilitates fast queries against user trust information.

For general on-card data, the logical file name is composed of a serial number. Common general data files, such as the master file that indicates the user default container name, will have pre-defined serial numbers.

Exemplary Certificates

By way of example, certificates can be stored on the smart card in the form of the following data structure:

```
#define CARD_CERT_FILE_CURRENT_VERSION 1
typedef struct_CARD_CERT_FILE_CONTENTS
{
    DWORD dwVersion;
    PBYTE pbEncodedCert
    DWORD cbEncodedCert;
}                       CARD_CERT_FILE_CONTENTS,
*PCARD_CERT_FILE_CONTENTS;
```
Well Known Files
Cache File
The well known name of the cache file should be:
"GeneralData\CacheFile"
define CARD_CACHE_FILE "GeneralData\CacheFile"
The contents of the cache file will consist only of the following structure.
```
#define CARD_CACHE_FILE_CURRENT_VERSION 1
typedef struct_CARD_CACHE_FILE_CONTENTS
{
    DWORD dwVersion;
    DWORD cContainers;
    DWORD cGeneralData;
    DWORD cPins;
}
```

An exemplary default access control list (ACL) for the Cache File will be as follows:
Everyone Read, Write
Serial Number File
The Serial Number file contains the card serial number. The well-known name should be:

```
"GeneralData\SerialNumberFile"
#define CARD_SERIAL_NUMBER_FILE "GeneralData\
SerialNumberFile"
The contents of the serial number file will consist only of the
following structure.
    typedef struct_CARD_SERIAL_NUMBER_FILE_CONTENTS
    {
        LPSTR pszSerialNumber;
    }
```

The default ACL for the Serial Number file will be as follows.
Everyone Read
Admin Read, Write
Default Container File
The Default Container File contains the GUID of the smart card's default container. The well known name can be:

```
"GeneralData\DefaultContainerFile"
#define
CARD_DEFAULT_CONTAINER_FILE,"GeneralData\Default
ContainerFile"
The contents of the default container file can include the following
structure.
    #define
CARD_DEFAULT_CONTAINER_FILE_CURRENT_VERSION 1
    typedef                                         struct
_CARD_DEFAULT_CONTAINER_FILE_CONTENTS
    {
        DWORD dwVersion;
        LPSTR pszDefaultContainer;
    }
```

The GUID specified in the pszDefaultContainer can be formatted in such a way that it can be used directly in calls to CardGetContainerInfo( ),CardPrivateKeyDecrypt( ), etc. The stored GUID also implies the name of the default user certificate, if any, corresponding with the default key container. To access the specified certificate file, call CardReadFile, for instance, and specify a file name composed of the returned GUID pre-pended with "UserCert\".

The default ACL for the Default Container file will be as follows.
Everyone Read
User Read, Write
Admin Read, Write
Access Control Lists
The card storage areas should be configured with sensible default ACL's.
Identities
Everyone
User
Admin
Access levels
Read
Write
Card Storage Areas
General Data
Everyone Read
User Read, Write Admin Read, Write
Containers
User Read, Write
Admin Write
User Pin
User Read, Write
Admin Read, Write
Admin Pin
Admin Read, Write Exemplary Smart Card Removal Techniques Here, the smart card interface should be able to respond robustly to notification of smart card removal from the smart card specific module, for example. If the smart card specific module detects a smart card removal, an appropriate status should be returned. In response, the smart card interface can attempt to reconnect to the smart card. If the reconnect is successful, the smart card specific operation should be re-attempted. If the reconnect fails, the status notification can be propagated out of the base-CSP.

An SCARDHANDLE can be included in the data that is passed the smart card interface to a smart card specific operation. Calls on that handle may result in SCARD_W_REMOVED_CARD being returned to the smart card interface. Included in the list of calls for which this case can be handled are all smart card specific operations plus Begin Transaction.

In response to SCARD_W_REMOVED_CARD, the Card Interface can attempt to recover—reconnect and re-try, per above. This is to check if the smart card has been re-inserted. If the base-CSP re-initialization of the smart card handle fails, and the current user context is not Silent, the base-CSP can display UI to the user prompting for the smart card to be re-inserted. If the current user context is Silent, or if the user Cancels in a UI operation, then the current Crypto API function will fail with SCARD_W_REMOVED_CARD.

Exemplary Base-CSP User Interface

As described above, the base-CSP may be required to interact with the user in certain situations. In certain exemplary implementations, the UI provided by the base-CSP acts as follows:

The base-CSP may display UI if the current user context was not acquired as Silent.

All dialogs displayed by the base-CSP should include a Cancel button. When the user presses Cancel, an appropriate error code can be returned by the affected Crypto API.

All dialogs are as specific as possible regarding which smart card, which operation, etc., to which the user is providing input.

Exemplary Scenarios

If a user context is not Silent then the base-CSP may display UI in situations such as the following:

If the smart card initialization fails then prompt the user to insert the requested smart card.

If a Crypto API operation is requested on a user context associated with a smart card other than the one currently inserted then prompt the user to insert the requested smart card.

If a Card Specific operation makes a PIN Cache request then the cached pin might be incorrect for the current operation. The status SCARD_W_WRONG_CHV can be returned to the Card Interface. In response, the user may be prompted to enter the correct PIN. Then the PIN Cache is updated and then there is a re-attempt of the Card Specific operation.

Exemplary Implementation

If possible, smart cards should be given friendly names, which can be included in the UI message text. The friendly name could be delivered during card personalization and could be relatively generic, such as "Domain user logon card," etc. Alternatively, the smart card serial number may be displayed, although it may be difficult for users to associate a given serial number with the actual smart card.

Since, in the United States, cryptographic signing of base-CSP packages is subject to certain export regulations, base-CSP resource strings can be delivered in a separate package from the base-CSP itself.

Two separate dialog boxes can be used in this exemplary base-CSP:

Card Insertion Dialog—This dialog may include a title bar, text box, and Cancel button.

Pin Dialog—This dialog may include a title bar, text box, edit box, OK button, and Cancel button.

Smart Card Specific Module

The smart card specific modules in this exemplary implementations are designed to implement a standardized set of macro-level operations, and map logical card file-system objects to physical card locations. Here, for example, each smart card specific operation implements a single, atomic transaction.

Exemplary Card Specific Operations

Card Capabilities

In certain implementations it may be necessary for the base-CSP to support multiple variations of specific smart cards and/or smart card specific modules. To take advantage of the capabilities of a given smart card, the smart card specific module can include an API that the base-CSP can use to query the full set of functionality provided by the smart card. Examples of smart card capabilities include compression algorithms and a guarantee of file integrity via checksum. If any functionality required by the base-CSP is provided by the smart card, such as compression, the base-CSP may rely on the smart card implementation. Otherwise, the base-CSP could fall back to its own implementation of this functionality.

```
#define CARD_CAPABILITIES_CURRENT_VERSION 1
typedef struct_CARD_CAPABILITIES
{
    DWORD dwVersion;
    BOOL fCompression;
    BOOL fFileChecksum;
} CARD_CAPABILITIES, *PCARD_CAPABILITIES;
CardQueryCapabilities
DWORD CardQueryCapabilities(
    IN PCARD_DATA pCardData,
    IN OUT PCARD_CAPABILITIES pCardCapabilities);
```

Input:
Version number should be set in pCardCapabilities
Output:
Status
Filled-in pCardCapabilities struct
Purpose:
Query the smart card and smart card specific module combination for the functionality provided at this level, such as, e.g., compression and file checksums.
Key Container
Enumerate
Delete
Create with Key Generate Create with Key Import In this example, two key pairs per container are supported. Associated with each key is a key usage, Signature or Key Exchange. In certain other implementations, a single key pair or more than two key pairs can be supported.

In certain implementations, also associated with each key container can be identifying information about the corresponding Certificate on the smart card (e.g., logical information about where to find the certificate data). Not all containers will have a corresponding certificate. This presupposes that multiple certificates per key are not supported.

```
CardEnumContainers
    DWORD CardEnumContainers(
        IN PCARD_DATA pCardData,
        IN DWORD dwFlags,
        OUT LPSTR pszContainerName);
```

Input:
First|Next
Output:
Status
GUID name of current key container
Purpose:
In successive calls, list the names of all key containers present on the smart card. Status should indicate failure if the end of the enumeration is reached and the contents of the output buffer have not changed.

```
CardDeleteContainer
    DWORD CardDeleteContainer(
        IN PCARD_DATA pCardData,
        IN DWORD dwReserved,
        IN LPSTR pszContainerName);
```

Input:
GUID
Output:
Status
Purpose:
Delete the key container named by the GUID. Status should indicate success if the container existed and was successfully deleted. Otherwise, status should indicate that container didn't exist, or delete failed for specific reason, or etc.

```
CardCreateContainer
    DWORD CardCreateContainer(
        IN PCARD_DATA pCardData,
        IN LPSTR pszContainerName,
        IN DWORD dwFlags,
        IN DWORD dwKeySize,
        IN PBYTE pbKeyData);
```

Input:
KeyGen|KeyImport
GUID
If KeyGen, a key-type and size must also be supplied.
If KeyImport, the key data must also be supplied.
Output:
Status Purpose:
Create a new key container named GUID. The new container will always contain a valid key if the call succeeds. The two methods of creating a new container are via random key generation and importation of existing key data.

If an application attempts to create a Certificate with key-exchange key usage using the default container, when the default container already has a Signature key, then this process will fail in the one-key model since the container is already "full," and the current key doesn't have the correct usage. Correct behavior might be to redirect the process to a new/different container.

```
CardGetContainerInfo
    DWORD CardGetContainerInfo(
        IN PCARD_DATA pCardData,
        IN LPSTR pszContainerName,
        IN OUT PCONTAINER_INFO pContainerInfo);
```

Input:
GUID
Output:
Status
Data
Purpose:
Query the specified key container for additional information about the key it contains, such as its Key Type (e.g., Signature or Key Exchange). The behavior can be to return all available container info. However, in other implementations it may be desirable to narrow the request to a specific piece of container data to limit the amount of data to be transferred.
There will be at least a 1:1 relationship between the information specified during CardCreateContainer and the information able to be queried by this call. That is, there is no container data accessible via CardGetContainerInfo that was not specified during CardCreateContainer.

```
Pin
CardSubmitPin
    DWORD CardSubmitPin(
        IN PCARD_INFO pCardInfo,
        IN LPSTR pszUserId,
        IN DATA_BLOB *Pin);
```

Input:
UserId
Pin
Output:
Status
Purpose:
Using the supplied PIN, authenticate the specified user (e.g., User or Admin.) to access card private data, such as user key containers. The use of this call can be regulated by a PIN Cache library.

```
CardChangePin
    DWORD CardChangePin(
        IN PCARD_INFO pCardInfo,
        IN LPSTR pszUserId,
        IN DATA_BLOB *CurrentPin,
```

```
            -continued
         IN DATA_BLOB *NewPin);
```

Input:
UserId
CurrentPin
NewPin
Output:
Status
Purpose:
Change the PIN for the specified user. In the base-CSP, this call will only be made via the PIN Cache library.

```
         CardUnblockPin
         DWORD CardUnblockPin(
             IN PCARD_INFO pCardInfo,
             IN DATA_BLOB *Pin);
```

Input:
Pin
Output:
Status
Purpose:
Using the supplied PIN, unblock a smart card which has been locked due to an incorrect user pin having been supplied more than the maximum number of allowed times. If the smart card was not blocked, or if the unblock failed, then the Status should specify these cases.

Public Data

Either in addition or as an alternative to Certificate management functionality, there may also be a need for interfaces that emulate generic file storage on the smart card.

Certificate management, for example, requires Enumerate, Delete, and Create functionality. This interface may have similar look and feel to simplified versions of conventional Windows) CreateFile, ReadFile, and WriteFile, for example. A file path parameter could be logically mapped to the physical layout of the smart card.

Here, in accordance with certain exemplary aspects of the present invention, it is up to the smart card specific modules to map the logical locations from the base-CSP to physical card locations. Essentially, this type of interface abstracts the smart card as a general, generic file system to be managed by the base-CSP.

An example of how the base-CSP can manage public card data using CreateFile semantics is via a master file stored on the card at a well-known location. This master file can serve as a directory of the objects that the base-CSP has stored in the card file-system. This would allow the base-CSP to lookup the file names associated with the user certificates and other data stored on a smart card. Hence, the contents of the Certificate file objects can be determined by the base-CSP. Included in the Certificate data can be information for locating its associated key container. This approach has some trade-offs, however, since additional smart card-reads will be necessary to first request the master file and then to request the actual data file in question (e.g., such as the default user certificate).

On the plus side, the use of a master file gives the base-CSP a great deal of control over how general smart card data is stored and accessed. In certain implementations this may better facilitate versioning of the smart card storage format and allow smart cards to be more versatile. For instance, rather than relying on the smart card to keep track of the name of the default user container, that information could simply be stored in a well-known general file. As a further optimization, the base-CSP can be configured to quickly read and cache the default file from the card at load time.

```
         CardReadFile
         DWORD CardReadFile(
             IN PCARD_INFO pCardInfo,
             IN LPSTR pszFileName,
             IN DWORD dwReserved,
             IN OUT DATA_BLOB *FileContents);
```

Input:
LogicalFileName
Buffer
BufferLength
Output:
Status
File Contents
File
Purpose:
Read the entire file specified by LogicalFileName into the user-supplied buffer. The location specified by LogicalFileName should be fully qualified and well formed per FileFormat, above.

If a data-pointer member of a FileContents parameter is set to NULL, then the function will place the size of the specified file in the FileContents data-size member. If the size of the file is greater than the FileContents data-size member, then no data will be copied into the caller buffer and the data-size member will be set to the size of the file. If the size of the file is less than the FileContents data-size member, the file will be copied into the caller buffer and the data-size member will be set to the size of the file.

```
         CardWriteFile
         DWORD CardWriteFile(
             IN PCARD_DATA pCardData,
             LPSTR pszFileName,
             DWORD dwFlags,
             IN DATA_BLOB *FileContents);
```

Input:
LogicalFileName
File Contents
File Contents Length
Flags
Output:
Status
Purpose:
Depending on Flags value, will create the file if it doesn't exist.

```
         CardDeleteFile
         DWORD CardDeleteFile(
             IN PCARD_DATA pCardData,
             IN DWORD dwReserved,
             IN LPSTR pszFileName);
```

Input:
LogicalFileName
Output:
Status
Purpose:
Delete the specified file. If the file doesn't exist, the returned Status should indicate if the file did not exist.

```
CardEnumFiles
DWORD CardEnumFiles(
    IN PCARD_DATA pCardData,
    IN DWORD dwFlags,
    IN OUT LPSTR pszFileName);
```

Input:
EnumFirst|EnumNext
EnumFirst, a directory prefix; see below.
Output:
LogicalFileName
Purpose:
For the ENUM_FIRST case, the LogicalFileName parameter can contain a directory prefix, restricting the scope of the enumeration.

```
CardQueryFreeSpace
DWORD CardQueryFreeSpace(
    IN PCARD_DATA pCardData,
    IN DWORD dwReserved,
    OUT PBYTE pbFreeSpaceInfo);
```

Input:
none
Output:
Status
Card space information (e.g. number of bytes left, number of available key containers)
Purpose:
Determine the amount of available smart card storage space. This may be an approximate value in some cases. Examples of the use of this information include determining if a new key container can be created and determining if the smart card has sufficient storage for a given certificate. The former can be used in calls to CryptAcquireContext CRYPT_NEWKEYSET to determine if the call should succeed, even though the key itself won't be created until CryptGenKey is called.
Cryptographic Operations
Sign Data/Private key Decrypt
The remainder of cryptographic functionality may come from the base-CSP for performance.

```
CardPrivateKeyDecrypt
DWORD CardPrivateKeyDecrypt(
    IN PCARD_DATA pCardData,
    IN LPSTR pszContainerName,
    IN DWORD dwReserved,
    IN OUT PBYTE pbData);
```

Input:
Ciphertext
Output:
Status
Plaintext
Purpose:
The input data for (RSA-based, elliptic/hyperelliptic curve-based, etc.) Decryption can be padded by the base-CSP based on the format requested by the caller (e.g. PKCS #1). Therefore, the data passed to and from CardPrivateKeyDecrypt, for RSA-based cards, for example, may always be equal in length to the public modulus. This frees the card specific layer from needing to implement various padding schemes. The base-CSP can validate the padding in the plaintext, so this API should succeed except in the case of hardware error.

```
CardQueryKeySizes
DWORD CardQueryKeySizes(
    IN PCARD_DATA pCardData,
    IN DWORD dwKeySpec,
    IN DWORD dwReserved,
    OUT PCARD_KEY_SIZES pKeySizes);
```

Input:
AT_SIGNATURE|AT_KEYEXCHANGE
Output:
Status
Supported key sizes for the specified algorithm type.
Purpose:
Determine the public key sizes supported by the card in use.
Data Structures
A common data structure can be used by all of the above smart card specific functions. See, e.g., the attached header for the definition of the CARD_DATA structure.
Implementation
Card Specific Modules can be implemented as a Provider Dll.

Given the above mentioned methods and apparatuses, one will recognize that a smart card or other like portable device can be used for the generic storage of data too. Thus, an architecture is provided that enables smart card vendors to provide a general-purpose smart card that can be used for storage of not only the private keys and their associated certificates, etc., but also data relating to other items, such as, other types of credentials, special applications, cert stores, etc. Hence, smart cards that support the above models will likely be usable in applications that are yet to be conceived. As such, the exemplary techniques presented herein are adaptable to new applications.

CONCLUSION

Although some exemplary implementations of the various methods and apparatuses of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:
1. A method, implemented at least in part by a computing device, for interfacing an application and a plurality of types of smartcards, the method comprising:
 accessing, using the application, a crypto API for communicating with the plurality of types of smart cards;

preventing direct communication between the crypto API and a plurality of types of smart card specific modules by passing the communication through a single base crypto service provider;

defining an interface, in the single base crypto service provider, for service activities comprising: PIN management; file management; container management; and cryptography operations;

performing the service activities for the plurality of types of smart card specific modules at the single base crypto service provider; and interfacing each of the plurality of types of smart cards with one of the plurality of types of smart card specific modules, wherein the service activities provided by the single base crypto service provider are not performed by the smart card specific modules.

2. The method of claim 1, wherein passing the communication through the single base crypto service provider, comprises:

communicating within a one-to-one relationship between the crypto API and the single base crypto service provider; and communicating within a one-to-many relationship between the single base crypto service provider and the plurality of smart card specific modules.

3. The method of claim 1, wherein cryptography operations performed by the service activities, comprise:

performing an authentication function, a data encryption function, a data decryption function, a message digest function, a signature function, and a hashing function.

4. The method of claim 1, wherein the file management activity comprises:

accessing at least one data file stored in a memory of a smart card.

5. The method of claim 1, wherein performing the service activities, comprises:

accessing, using a smart card specific module, a well-defined set of interface functions defined on the single base crypto service provider.

6. The method of claim 1, wherein interfacing each of the plurality of types of smart cards with one of the plurality of types of smart card specific modules comprises:

detecting card removal from the smart card reader and for mapping logical filenames to physical card locations.

7. The method of claim 1, additionally comprising:

adding new and/or different smart cards to the plurality of types of smart cards, wherein the added smart cards are configured with smart card specific modules to access the interface for service activities.

8. A computing device, configured for interfacing an application and a plurality of types of smartcards, the computing device comprising:

a crypto API, configured for access by an application and for communication with the plurality of types of smart cards;

a single base crypto service provider, configured to prevent direct communication between the crypto API and a plurality of types of smart card specific modules, wherein communication between the crypto API and the single base crypto service is in a one-to-one relationship and communication between the single base crypto service provider and the plurality of smart card specific modules is in a one-to-many relationship; and an interface, defined in the single base crypto service provider, for service activities comprising: PIN management; file management; container management; and cryptography operations; wherein the service activities are performed for the plurality of types of smart card specific modules at the single base crypto service provider;

wherein each of the plurality of types of smart cards are interfaced with one of the plurality of types of smart card specific modules.

9. The computing device of claim 8, wherein cryptography operations performed by the service activities, comprise an authentication function, a data encryption function, a data decryption function, a message digest function, a signature function, and a hashing function.

10. The computing device of claim 8, wherein the file management activity comprises accessing at least one data file stored in a memory of a smart card.

11. The computing device of claim 8, wherein the single base crypto service provider comprises a well-defined set of interface functions for access by the plurality of smart card specific modules.

12. The computing device of claim 8, wherein the plurality of types of smart card specific modules are configured to detect card removal from a smart card reader and for mapping logical filenames to physical card locations.

13. The computing device of claim 8, wherein the one-to-many relationship is configured to allow new and/or different smart cards and associated new and/or different smart card specific modules to access the interface for service activities are added to the plurality of types of smart cards.

14. One or more computer readable media, comprising computer-executable instructions, for interfacing an application and a plurality of types of smartcards, the media defining instructions for:

communicating between an application and a plurality of smart cards through a crypto API;

interfacing the crypto API and a plurality of types of smart card modules with a single base crypto service provider, wherein direct communication between the plurality of smart card modules and the crypto API is prevented;

providing an interface, in the single base crypto service provider, for service activities comprising: PIN management; file management; container management; and cryptography operations;

performing the service activities for the plurality of types of smart card specific modules at the single base crypto service provider; and interfacing each of the plurality of types of smart cards with one of the plurality of types of smart card specific modules, wherein the service activities provided by the single base crypto service provider are not performed by the smart card specific modules.

15. The computer readable media of claim 14, wherein interfacing the crypto API and the plurality of types of smart card modules with the single base crypto service provider, comprises:

communicating within a one-to-one relationship between the crypto API and the single base crypto service provider; and communicating within a one-to-many relationship between the single base crypto service provider and the plurality of smart card specific modules.

16. The computer readable media of claim 14, wherein cryptography operations performed by the service activities, comprise:

performing an authentication function, a data encryption function, a data decryption function, a message digest function, a signature function, and a hashing function.

17. The computer readable media of claim 14, wherein the file management activity comprises:

accessing at least one data file stored in a memory of a smart card.

18. The computer readable media of claim 14, wherein performing the service activities, comprises:

accessing, using a smart card specific module, a well-defined set of interface functions defined on the single base crypto service provider.

19. The computer readable media of claim 14, wherein interfacing each of the plurality of types of smart cards with one of the plurality of types of smart card specific modules comprises:

detecting card removal from the smart card reader and for mapping logical filenames to physical card locations.

20. The computer readable media of claim 14, additionally comprising:

adding new and/or different smart cards to the plurality of types of smart cards, wherein the added smart cards are configured with smart card specific modules to access the interface for service activities.

* * * * *